Sept. 4, 1956  B. P. MARPLES ET AL  2,761,624
SENSING MECHANISM FOR STATISTICAL MACHINES
Filed June 13, 1955  3 Sheets-Sheet 1
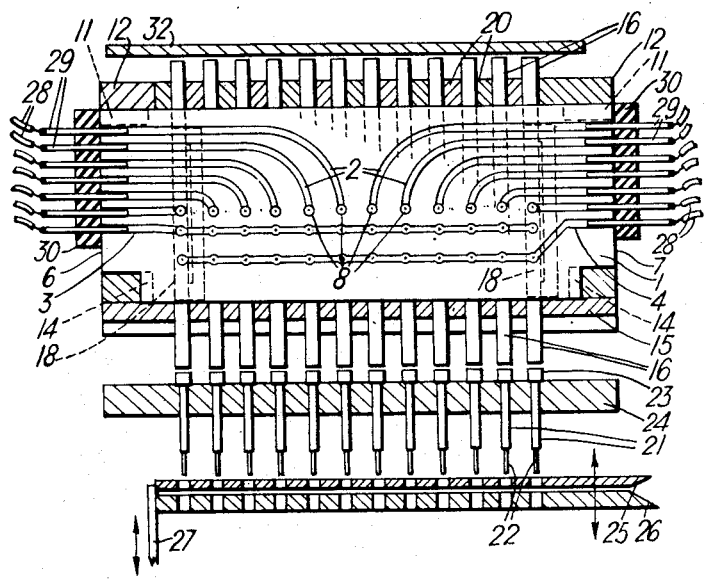
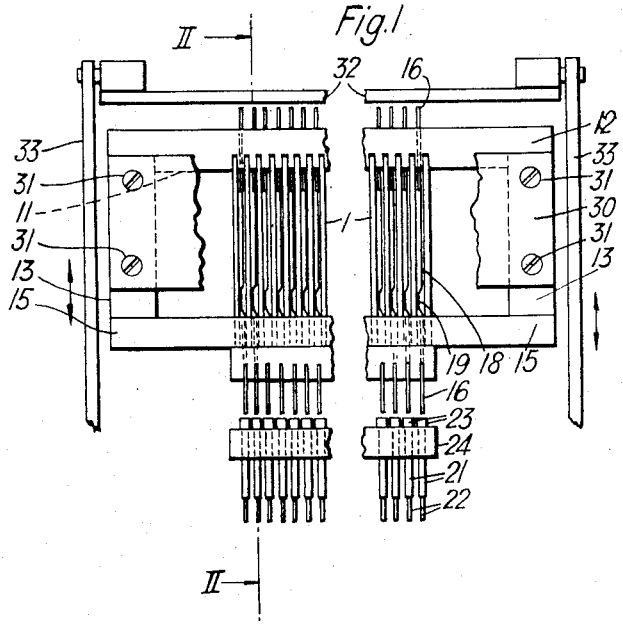
Inventor
BERNARD P. MARPLES & JOHN C. DAVY
By

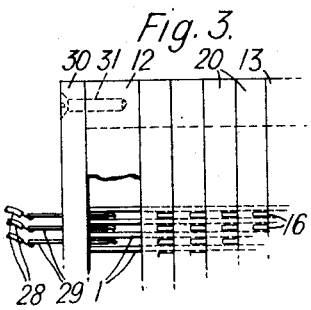
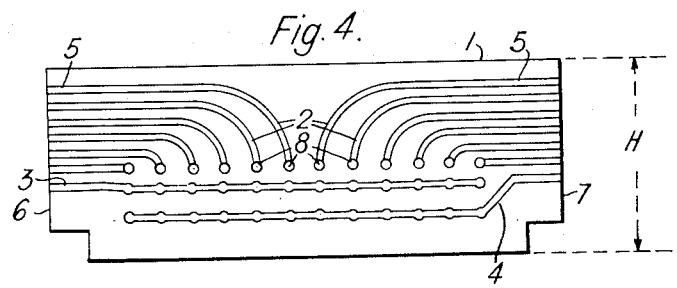
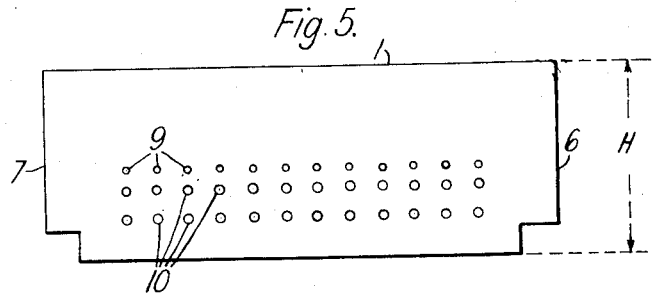

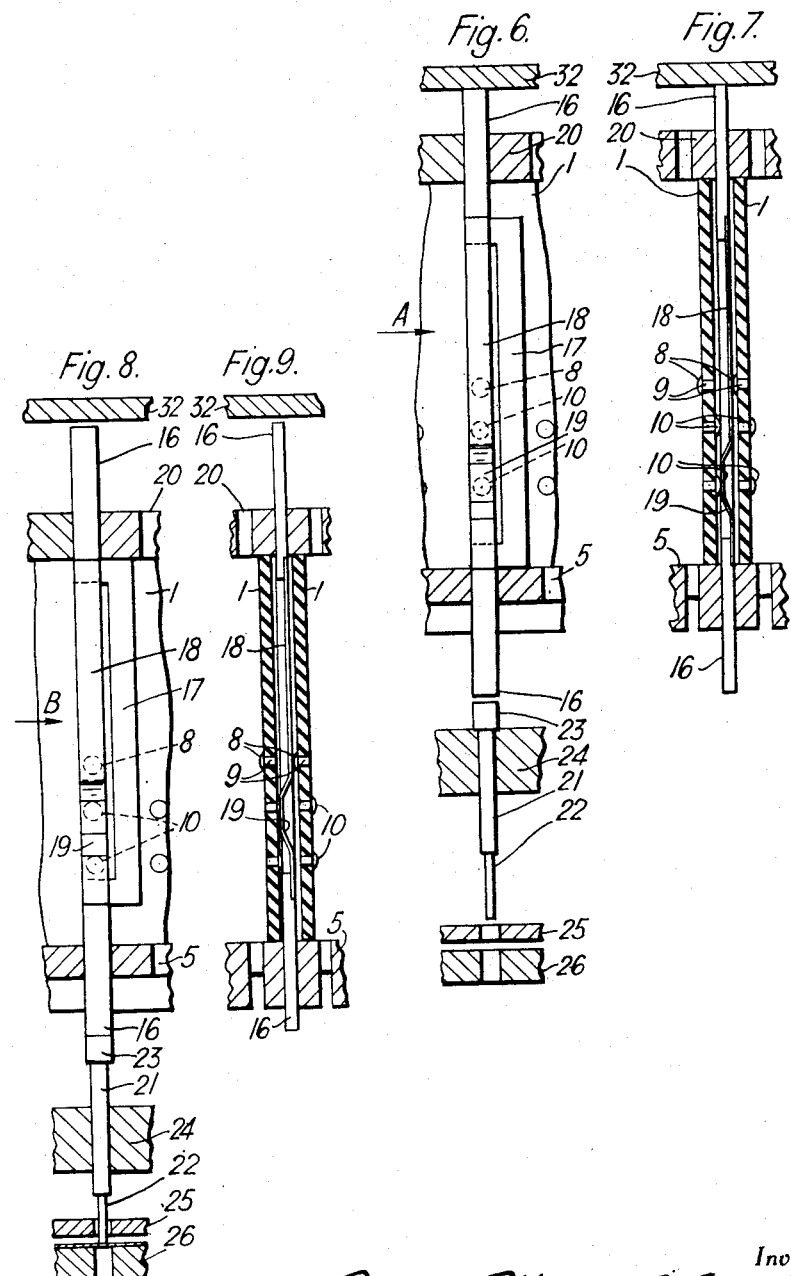

United States Patent Office

2,761,624
Patented Sept. 4, 1956

2,761,624

SENSING MECHANISM FOR STATISTICAL MACHINES

Bernard Philip Marples, Sanderstead, and John Colin Davy, Woldingham, England, assignors to Powers-Samas Accounting Machines Limited, London, England, a British company Application June 13, 1955, Serial No. 515,155

Claims priority, application Great Britain July 22, 1954

18 Claims. (Cl. 235—61.11)

This invention relates to statistical machines and in particular to apparatus for use therewith, for example in analyzing perforated records such as cards or tapes to control functions of the machine at a time when the passage of the record through the machine is temporarily arrested.

It is a main object of the invention to provide analyzing apparatus which contains a minimum of moving parts, is easy to assemble and to dismantle for servicing, which occupies little space, and is economical to produce.

According to the present invention analysing apparatus for use in statistical machines comprises for each column of a record to be sensed a contact leaf of electrically non-conductive material, a data-indicating contact line of electrically conductive material printed on the contact leaf for each data-indicating position of a record column to be sensed and for connection in an electric circuit, a common contact line of electrically conductive material printed on the contact leaf to be common to all data-indicating contact lines of a contact leaf, a normally inactive contact pin for each said data-indicating contact line of a contact leaf, said pin being supported for continuous resilient frictional engagement with the data-indicating contact line appropriated thereto and for lengthwise movement from the inactive position thereof in response to the sensing of a record to make or break electrical contact between its data-indicating contact line and a common contact line appropriate thereto, and restoring means to restore active pins to the normally inactive positions thereof.

In order that the invention may be clearly understood one embodiment thereof will now be described, by way of example, with reference to the accompanying diagrammatic drawings, in which:

Fig. 1 is a side elevation of apparatus for analysing perforated record cards, some parts of the apparatus being broken away more clearly to show other parts, Fig. 2 is a section on line II—II, Fig. 1, Fig. 3 is a top plan of a part of Fig. 2, Fig. 4 shows one side of a contact leaf embodied in the apparatus, Fig. 5 shows the side of a contact leaf opposite the side thereof shown in Fig. 4, Fig. 6 is a side elevation, to an enlarged scale, illustrating the mode of operation of the apparatus, Fig. 7 is an end view of a part of Fig. 6 looking in the direction of arrow A, Fig. 6, Fig. 8 is a view similar to Fig. 6, but showing the parts in different positions, and Fig. 9 is an end elevation of a part of Fig. 8 looking in the direction of arrow B, Fig. 8.

Referring to the drawings the analysing apparatus comprises a plurality of contact leaves 1, of which one leaf is shown in detail in Figs. 4 and 5. The number of leaves 1 provided in the apparatus is determined by the number of columns of a card to be sensed. Thus, for example, if the card is a 45 column card it will include forty-five leaves, if it is a 65 column card it will include sixty-five leaves, or if it is an 80 column card it will include eighty leaves. With the arrangement about to be described, however, in each instance the apparatus will include one further leaf, the purpose of which will hereinafter appear, so that an apparatus for sensing a 45 column card will include forty-six leaves, for sensing a 65 column card will include sixty-six leaves, and for sensing an 80 column card will include eighty-one leaves.

Each contact leaf 1 is made of a flat substantially rectangular piece of electrically non-conductive material of any desired thickness, although as can be seen particularly from Fig. 1 the thickness of the material can be relatively small, for example it may be of the order of $\frac{1}{32}$ inch. One side of each leaf 1 is provided, as shown clearly in Figs. 2 and 4, with a plurality of lines of electrically conductive material, the lines being printed on the non-conductive material in known manner, forming no part of the present invetion. As can be seen from Figs. 3 and 4, the printed lines of electrically conductive material include twelve data-indicating contact lines 2 together with a first common contact line 3, and a second common contact line 4. The data-indicating contact lines 2 correspond one each to a data-indicating position of a record column to be sensed on a card.

The data-indicating contact lines 2 are located in two groups and in each group one end 5, Fig. 4, of each line is located adjacent one of the opposite edges 6 or 7 of the contact leaf 1. The other end of each line is provided with an electrically conductive contact stud 8 the head of which makes electrical contact with and stands proud of the end of the line. The studs 8 are arranged in a row across the contact leaf, as shown in Figs. 2 and 4, in positions spaced apart from each other so that when the contact leaves are in situ in the apparatus the centres of the studs 8 are aligned one with each of the data-indicating positions of a column of a card located in position for sensing each to be coincident with a line passing through the centre of a data-indicating position of a card column. The studs 8 extend through the contact leaf 1 so that the headless ends 9 thereof are located substantially in the plane of the opposite side of the leaf 1, as shown in Fig. 5. Between their ends the data-indicating contact lines 2 include portions which are spaced from each other and which are located one over the other in the plane of the contact leaf, as illustrated in Figs. 2 and 4. The arrangement of the data-indicating lines in two groups as just described is to permit the the height H, Fig. 4, of the leaf to be reduced to a minimum, but it will be understood that, if desired, the ends of the lines remote from those provided with the studs 8 could all terminate adjacent the same edge of the contact leaf.

As can be seen from Figs. 2 and 4, each of the common contact lines 3, 4 is parallel with a row of studs 8 and has one end thereof located adjacent an edge of the contact leaf and each line 3, 4 is provided with a number of contact studs 10 making electrical contact with the printed line and terminating in heads which stand proud from the reverse side of the leaf from the side on which the common contact lines 3, 4 are printed, see Fig. 5. As can be seen from Figs. 2, 4 and 5, the studs 10 correspond in number to the studs 8, and are located to be directly beneath the studs 8.

The contact leaves 1 are supported in spaced side by side relation, as shown in Fig. 1, and are retained in their spaced positions by comb members 11 formed on the under-side of two bars 12, Fig. 2 secured to fixed side plates 13 and by lower comb members 14 formed on a lower plate 15 also secured to the side plates 13. The arrangement of the contact leaves 1 is such that they can be lifted out of the bottom comb members 14 when the top combs 12, and combs 20 referred to below, are removed.

Between each pair of contact leaves 1 are located twelve contact pins, one for each data-indicating contact line on a contact leaf 1. Each contact pin, as shown in Figs. 6 to 9, comprises a pair of aligned guide elements 16, spaced apart in a lengthwise direction and connected by a U-shaped element integral therewith. The base 17 of the U-shaped element is spaced laterally from and is parallel with the guide elements 16. The contact pin is completed by a beryllium copper contact spring 18 which is connected to, and extends lengthwise between, the guide elements 16, the contact spring 18 when the contact pin is in situ in the apparatus being arranged permanently to engage the head of the stud 8 appropriate thereto and to engage with one or other of a pair of studs 10 provided in a pair of common contact lines 3, 4. As can be seen from Figs. 6 to 9, in the arrangement of the apparatus as herein described, the contact spring 18 engages a stud 8 provided on one contact leaf and is provided with an out-set portion 19 which is engaged by a stud 10 of a common contact line 3, 4 provided on the other of the two contact leaves 1 between which the contact pin is located. It is because of this particular arrangement that the assemblage comprises one contact leaf 1 in excess of the number of card columns to be sensed, as mentioned above.

The guide elements 16 are located one in a top comb 20 secured to the top of the side frames 13 and the other in holes passing through the lower plate 15. The contact pins are supported by the top combs 20 and the holes in the lower plate 15 for lengthwise sliding movement and in the normal inactive positions thereof a contact pin occupies the position thereof shown in Figs. 6 and 7 while in the active position thereof it occupies the position shown in Figs. 8 and 9.

The contact pins are movable from the inactive positions to the active positions thereof by sensing pins 21 each provided with a card sensing portion 22 and a head 23 for engagement with a lower guide element 16. The sensing pins 21 are supported for free lengthwise movement in a fixed plate 24 made of suitable electrically insulating material, and upward lengthwise movement of the pins 21 is effected when an imperforate data-indicating position of a card is raised into engagement therewith, as illustrated in Figs. 8 and 9. It is to be understood, however, that if desired, the sensing pins 21 may be dispensed with and the ends of lower guide elements 16 shaped suitably so that they will perform the functions of the pins 21 to effect sensing of a record.

A card to be sensed is fed, by any suitable known means, into a card chamber consisting, in known manner, of an upper plate 25 and a lower plate 26, Fig. 2. A card to be sensed is located, as is customary, between the plates by a card stop 27. The card stop 27, as is usual, is reciprocable into and out of the path of cards being delivered to and moved from the card chamber 25, 26, and in the embodiment of the invention herein described, the arrangement is such that when a card is arrested by the stop 27, the card chamber 25, 26 is reciprocated, in known manner not shown, from the lower position thereof illustrated in Fig. 6 to the upper position thereof illustrated in Fig. 8. Accordingly, if during the upward movement of the chamber 25, 26 a sensing pin 21, or the lower guide element 16 if such is used as a sensing element, is engaged by an imperforate data-indicating portion of a card, the pin 21 is raised, as shown in Fig. 8, and during its upward movement it engages the lower guide element 16 co-operating therewith thereby to effect upward movement of the contact pin of which the element 16 is a part. This upward movement of the contact pin causes the out-set portion 19 of the contact spring 18 to be moved out of engagement with the lower of the studs 10 with which it cooperates and into engagement with the upper of the studs 10, as shown clearly in Figs. 7 and 9.

The printed contact lines and the contact leaves 1 are connected in electric circuits so as to control machine functions according to the perforation pattern of a record card, for example the printed contact lines may be connected to accumulator mechanism, or to apparatus for effecting printing, or some of the printed contact lines may be preselected for connection in electric circuits to control special functions of the machine to which the apparatus is fitted.

To facilitate the manufacture and servicing of the apparatus, the leads 28, Figs. 2 and 3, are not connected directly to the ends of the printed lines adjacent the edges of the contact leaves, but are connected to spring contact elements 29 supported by a detachable contact carrier 30, made of insulating material, the carrier 30 being connected to the side frames 13 by screws 31, or by any other suitable means, permitting the easy detachment of the carrier from the apparatus.

During a sensing operation, electrical potential is applied, for example by a rotary switch, not shown, to the leads 28 in timed relation with the reciprocating movement of the card chamber 25, 26 and the arrangement is such that each circuit is normally conditioned to pass the current when the contact pins are in the normal inactive positions thereof, as shown in Fig. 7, and the circuit is broken when a contact pin is raised to the active position thereof as shown in Fig. 9. Thus, if a contact pin is not raised, thereby indicating that the end 22 of its co-operating sensing pin 21 has passed through a card perforation, the circuit controlled by that contact pin will remain closed so that the appropriate machine function is performed when potential is applied to the leads 28.

It will be understood that, if desired, each contact leaf may be provided with only one common contact line instead of two as above described and the open or closed position of the circuit will then be determined by whether the out-set portion 19 of a contact spring is engaged with or disengaged from the stud 10 provided in the common contact line. Further, if desired, the lines 3, 4 may be on the side of the contact leaf opposite from that on which the lines 2 are printed.

The tension in the contact spring 18 is such that the contact pin of which it is a part will remain in the inactive or active position thereof until the pin is moved positively from such position. It will therefore be understood that actuated contact pins can be retained in the active positions thereof for any desired period of time after a sensing operation and will not be disturbed until positive action is taken to restore them to the inactive positions thereof. This positive action is provided by a restoring plate 32 common to all of the contact pins of the apparatus. As diagrammatically illustrated in Fig. 1, the restoring plate 32 is operated by reciprocable links 33, operation of which is effected in any suitable manner, not shown, as for example by a cam operating in timed relation with the reciprocating movements of the card chamber 25, 26. In Figs. 6 and 7, the restoring plate 32 is illustrated as having just completed the return of a contact pin to the normal inactive position thereof. It will, however, be understood that the plate 32 is raised out of engagement with the contact pins immediately it has restored active contact pins to the inactive positions thereof.

In the foregoing description the restoring bar 32 has been described as co-operating with the upper ends of the contact pins 16 but it will be understood that, if desired, the pins may be restored in any other suitable manner thereby to permit a part or the whole of the upper ends of the pins to be employed as transmission elements, for example a unit as herein described could be employed between a punch unit and a set-bar unit therefor to sense and give an indication of the data being recorded by the punch unit. Accordingly, the term "analysing" when used herein is to be read and understood as including apparatus of the kind herein described for use in a statistical for any purpose for which it is suited.

We claim:

1. Analysing apparatus for use in statistical machines, comprising for each column of a record to be sensed a contact leaf of electrically non-conductive material, a data-indicating contact line of electrically conductive material printed on the contact leaf for each data-indicating position of a record column and for connection in an electric circuit, a common contact line of electrically conductive material printed on the contact leaf to be common to all data-indicating contact lines of a contact leaf, a normally inactive contact pin for each said data-indicating contact line of a contact leaf, said pin being supported for continuous resilient frictional engagement with the data-indicating contact line appropriated thereto and for lengthwise movement from the inactive position thereof in response to the sensing of a record to make or break electrical contact between its data-indicating contact line and a common contact line appropriate thereto, and restoring means to restore active pins to the normally inactive positions thereof.

2. Analysing apparatus for use in statistical machines, comprising for each column of a record to be sensed a contact leaf of electrically non-conductive material, a data-indicating contact line of electrically conductive material printed on the contact leaf for each data-indicating position of a record column and for connection in an electric circuit, a first and a second common contact line of electrically conductive material printed on the contact leaf each to be common to all data-indicating contact lines of a contact leaf, a normally inactive contact pin for each said data-indicating contact line of a contact leaf, said pin being supported for continuous resilient frictional engagement with the data-indicating line appropriated thereto and with one of said common contact lines and movable lengthwise in response to the sensing of a record to make contact between the data-indicating line and the other of said common contact lines appropriate thereto, and restoring means to restore active pins to the normally inactive positions thereof.

3. Analysing apparatus for use in a statistical machine, comprising for each column of a record to be sensed a contact leaf of generally rectangular shape made from electrically non-conductive material, a data-indicating contact line of electrically conductive material printed on the contact leaf for each data-indicating position of a record column, one end of each said data-indicating line being located adjacent an edge of the contact leaf for connection in an electric circuit and the other end being located betwen said edge and the edge opposite thereto, portions of the data-indicating contact lines between the ends thereof and including the ends adjacent said leaf edge being spaced from each other and located one over the other in the plane of the contact leaf, a common contact line of electrically conductive material printed on the contact leaf to be common to all data-indicating contact lines of a contact leaf, a normally inactive contact pin for each said data-indicating contact line of a contact leaf, said pin being supported for continuous resilient frictional engagement with the end of its data-indicating contact line located between said opposite edges of the contact leaf and for lengthwise movement from the inactive position thereof in response to the sensing of a record to make or break electrical contact between its data-indicating contact line and a common contact line appropriate thereto, and restoring means to restore active pins to the normally inactive positions thereof.

4. Apparatus according to claim 3, including for each data-indicating contact line an electrically conductive stud making electrical contact with the end of the line located between said opposite edges of the contact leaf, said studs being located in a row across the contact leaf to be engaged by the contact pins appropriate thereto and having their centres each arranged to be coincident with a line passing through the centre of a data-indicating position of a record column in sensing relation with the contact pin co-operating with the stud.

5. Apparatus according to claim 4, wherein said common contact line is parallel with said row of studs and includes electrically conductive studs electrically connected therewith and aligned one with each stud of said row for co-operation with a contact pin appropriate thereto.

6. Apparatus according to claim 5, wherein said common contact lines are printed on the sides of contact leaves opposite the sides thereof on which the data-indicating contact lines are printed thereby to permit the contact pins for one contact leaf to engage the studs of the row thereof thereon and to co-operate with the common contact line on the next adjacent contact leaf, the apparatus including one contact leaf in excess of the number of record columns to be sensed.

7. Analysing apparatus for use in statistical machines, comprising for each column of a record to be sensed a contact leaf of electrically non-conductive material, a data-indicating contact line of electrically conductive material printed on the contact leaf for each data-indicating position of a record column and for connection in an electric circuit, a common contact line of electrically conductive material printed on the contact leaf to be common to all data-indicating contact lines of a contact leaf, a normally inactive contact pin for each data-indicating contact line of a contact leaf, said pin comprising a pair of aligned guide elements spaced apart in a lengthwise direction, a U-shaped element connecting the guide elements and having its base spaced therefrom and parallel thereto, and a contact spring connected to and extending lengthwise between the guide elements to make continuous resilient frictional engagement with a data-indicating contact line appropriated thereto, said guide elements being supported for lengthwise movement in response to the sensing of a record thereby to move the contact spring to make or break electrical contact between its data-indicating contact line and a common contact line appropriate thereto, and restoring means to restore active contact pins to the normally inactive positions thereof.

8. Analysing apparatus for use in a statistical machine, comprising for each column of a record to be sensed a contact leaf of generally rectangular shape made from electrically non-conductive material, a data-indicating contact line of electrically conductive material printed on the contact leaf for each data-indicating position of a record column, one end of each said data-indicating contact line being located between opposite edges of the contact leaf and the other ends of the data-indicating contact lines being located in two groups one adjacent each of said opposite edges of the contact leaf for connection in electric circuits appropriate thereto, a common contact line of electrically conductive material printed on the contact leaf to be common to all data-indicating contact lines of a contact leaf, a normally inactive contact pin for each said data-indicating contact line of a contact leaf, said pin being supported for continuous resilient frictional engagement with the end of its data-indicating contact line located between said opposite edges of the contact leaf and for lengthwise movement from the inactive position thereof in response to the sensing of a record to make or break electrical contact between its data-indicating contact line and a common contact line appropriate thereto, and restoring means to restore active pins to the normally inactive positions thereof.

9. Apparatus according to claim 8 including for each data-indicating contact line an electrically conductive stud making electrical contact with the end of the line located between said opposite edges of the contact leaf, said studs being located in a row across the contact leaf to be engaged by the contact pins appropriate thereto and having their centres each arranged to be coincident with a line passing through the centre of a data-indicating position of a record column in sensing relation with the contact pin co-operating with the stud.

10. Apparatus according to claim 9, wherein said common contact line is parallel with said row of studs and includes electrically conductive studs electrically connected therewith and aligned one with each stud of said row for co-operation with a contact pin appropriate thereto.

11. Apparatus according to claim 10, wherein said common contact lines are printed on the sides of contact leaves opposite the sides thereof on which the data-indicating contact lines are printed thereby to permit the contact pins for one contact leaf to engage the studs of the row thereof thereon and to co-operate with the common contact line on the next adjacent contact leaf, the apparatus including one contact leaf in excess of the number of record columns to be sensed.

12. Analysing apparatus for use in statistical machines, comprising for each column of a record to be sensed a contact leaf of generally rectangular shape made from electrically non-conductive material, a data-indicating contact line of electrically conductive material printed on the contact leaf for each data-indicating position of a record column, one end of each said data-indicating contact line being located between opposite edges of the contact leaf and the other ends of the data-indicating contact lines being located in two groups one adjacent each of said opposite edges of the contact leaf for connection in electric circuits appropriate thereto, a first and a second common contact line of electrically conductive material printed on the contact leaf each to be common to all data-indicating contact lines of a contact leaf, a normally inactive contact pin for each said data-indicating contact line of a contact leaf, said pin being supported for continuous resilient frictional engagement with the data-indicating line appropriated thereto and with one of said common contact lines and movable lengthwise in response to the sensing of a record to make contact between the data-indicating line and the other of said common contact lines appropriate thereto, and restoring means to restore active pins to the normally inactive positions thereof.

13. Analysing apparatus for use in statistical machines, comprising for each column of a record to be sensed a contact leaf of generally rectangular shape made from electrically non-conductive material, a data-indicating contact line of electrically conductive material printed on the contact leaf for each data-indicating position of a record column, one end of each said data-indicating contact line being loaded between opposite edges of the contact leaf and the other ends of the data-indicating contact lines being located two groups one adjacent each of said opposite edges of the contact leaf, a frame to support the contact leaves in side-by-side spaced relation, a pair of detachable contact carriers for attachment to opposite sides of said frame, a row of contact elements supported by each said contact carrier for each said contact leaf, each said row including a number of contact elements corresponding in number to the number of data-indicating contact lines in a group adjacent an edge of a contact leaf and each contact element being supported by its carrier frictionally to engage and make electrical contact with one line only of the group, a first and a second common contact line of electrically conductive material printed on the contact leaf each to be common to all data-indicating contact lines of a contact leaf, a normally inactive contact pin for each said data-indicating contact line of a contact leaf, said pin being supported for continuous resilient frictional engagement with the data-indicating line appropriated thereto and with one of said common contact lines and movable lengthwise in response to the sensing of a record to make contact between the data-indicating line and the other of said common contact lines appropriate thereto, and restoring means to restore active pins to the normally inactive positions thereof.

14. Analysing apparatus for use in statistical machines, comprising for each column of a record to be sensed a contact leaf of generally rectangular shape made from electrically non-conductive material, a data-indicating contact line of electrically conductive material printed on the contact leaf for each data-indicating position of a record column, one end of each said data-indicating contact line being located between opposite edges of the contact leaf and the other ends of the data-indicating contact lines being located in two groups one adjacent each of said opposite edges of the contact leaf, a frame to support the contact leaves in side-by-side spaced relation, a pair of detachable contact carriers for attachment to opposite sides of said frame, a row of contact elements supported by each said contact carrier for each said contact leaf, each said row including a number of contact elements corresponding in number to the number of data-indicating contact lines in a group adjacent an edge of a contact leaf and each contact element being supported by its carrier frictionally to engage and make electrical contact with one line only of the group, a common contact line of electrically conductive material printed on the contact leaf to be common to all said data-indicating contact line ends located between said opposite edges of the contact leaf, a normally inactive contact pin for each data-indicating contact line of a contact leaf, said pin comprising a pair of aligned guide elements spaced apart in a lengthwise direction, a U-shaped element connecting the guide elements and having its base spaced therefrom and parallel thereto, and a contact spring connected to and extending lengthwise between the guide elements to make continuous resilient frictional engagement with a data-indicating contact line appropriated thereto, said guide elements being supported for lengthwise movement in response to the sensing of a record thereby to move the contact spring to make or break electrical contact between its data-indicating contact line and a common contact line appropriate thereto, and restoring means to restore active contact pins to the normally inactive positions thereof.

15. Analysing apparatus for use in statistical machines comprising for each column of a record to be sensed a contact leaf of generally rectangular shape made from electrically non-conductive material, a data-indicating contact line of electrically conductive material printed on the contact leaf for each data-indicating position of a record column, one end of each said data-indicating contact line being located between opposite edges of the contact leaf and the other ends of the data-indicating contact lines being located in two groups one adjacent each of said opposite edges of the contact leaf, a frame to support the contact leaves in side-by-side spaced relation, a pair of detachable contact carriers for attachment to opposite sides of said frame, a row of contact elements supported by each said contact carrier for each said contact leaf, each said row including a number of contact elements corresponding in number to the number of data-indicating contact lines in a group adjacent an edge of a contact leaf and each contact element being supported by its carrier frictionally to engage and make electrical contact with one line only of the group, a first and a second common contact line of electrically conductive material printed on the contact leaf each to be common to all said data-indicating contact line ends located between said opposite edges of the contact leaf, a normally inactive contact for each data-indicating contact line of a contact leaf, said pin comprising a pair of aligned guide elements spaced apart in a lengthwise direction, a U-shaped element connecting the guide elements and having its base spaced therefrom and parallel thereto, and a contact spring connected to and extending lengthwise between the guide elements to make continuous resilient frictional engagement with the end of a data-indicating contact line appropriated thereto and located between said opposite side of its contact leaf and to make contact with one of said common contact lines, said guide elements being supported for lengthwise movement in response to the sensing of a record thereby to move the contact spring out of engagement with said one common contact line and into engagement with the other thereof, and restoring means to restore active contact pins to the normally inactive positions thereof.

16. Apparatus according to claim 15, including for each data-indicating contact line an electrically conductive stud making electrical contact with the end of the line located between said opposite edges of the contact leaf, said studs being located in a row across the contact leaf to be engaged by the contact springs of contact pins appropriate thereto and having their centres each arranged to be coincident with a line passing through the centre of a data-indicating position of a record column in sensing relation with the contact pin co-operating with the stud.

17. Apparatus according to claim 16, wherein each said common contact line is parallel with said row of studs and includes electrically conductive studs electrically connected therewith and aligned one with each stud of said row for co-operation with the contact spring of a contact pin appropriate thereto.

18. Apparatus according to claim 17, wherein said common contact lines are printed on the sides of contact leaves opposite the sides thereof on which the data-indicating contact lines are printed thereby to permit the contact springs of contact pins for one contact leaf to engage the studs of the row thereon and to co-operate with the first and second common contact lines on the next adjacent contact leaf, the apparatus including one contact leaf in excess of the number of record columns to be sensed.

No references cited.